United States Patent [19]

Voigt

[11] 4,022,451
[45] May 10, 1977

[54] IMPACT DAMPING SYSTEM AND SUSPENSION THEREFOR

[75] Inventor: Gerhard Voigt, Wolfsburg, Germany

[73] Assignee: Volkswagenwerk Aktiengesellschaft, Wolfsburg, Germany

[22] Filed: Aug. 20, 1975

[21] Appl. No.: 606,335

[30] Foreign Application Priority Data

Aug. 24, 1974 Germany .......................... 2440694

[52] U.S. Cl. ................................ 267/116; 267/139; 293/85

[51] Int. Cl.² .................... B61G 11/12; B60R 19/02

[58] Field of Search ............... 293/1, 60, 70, 84–86, 293/99, 101, DIG. 2, DIG. 3, 96, 98, 89; 248/300; 267/116, 139; 213/1 A, 220; 188/1 C, 266, 321–322

[56] References Cited

UNITED STATES PATENTS

| 1,570,624 | 1/1926 | Dominguez | 293/86 X |
| 1,956,491 | 4/1934 | Capogreco | 293/85 X |
| 3,751,091 | 8/1973 | Renneker | 293/85 X |
| 3,795,418 | 3/1974 | Barenyi et al. | 293/86 X |
| 3,847,426 | 11/1974 | McGettigan | 293/1 |

FOREIGN PATENTS OR APPLICATIONS

| 256,551 | 1/1928 | Italy | 293/86 |
| 15,402 | 6/1910 | United Kingdom | 213/220 |

Primary Examiner—Robert B. Reeves
Assistant Examiner—Charles A. Marmor
Attorney, Agent, or Firm—Brumbaugh, Graves, Donohue & Raymond

[57] ABSTRACT

An impact damping system, e.g., for motor vehicles, has a telescoping shock absorber whose damping cylinder is closed off by an end wall. The damping cylinder of the shock absorber is welded to a suspension for the impact damping system near its rear end and the forward sections of the damping cylinder are supported by a flanged part of the suspension. The shock absorber piston slides in telescope-fashion in the damping cylinder. At its frontal end the piston is provided with elements for supporting a shock cushioning device, such as a bumper.

3 Claims, 4 Drawing Figures

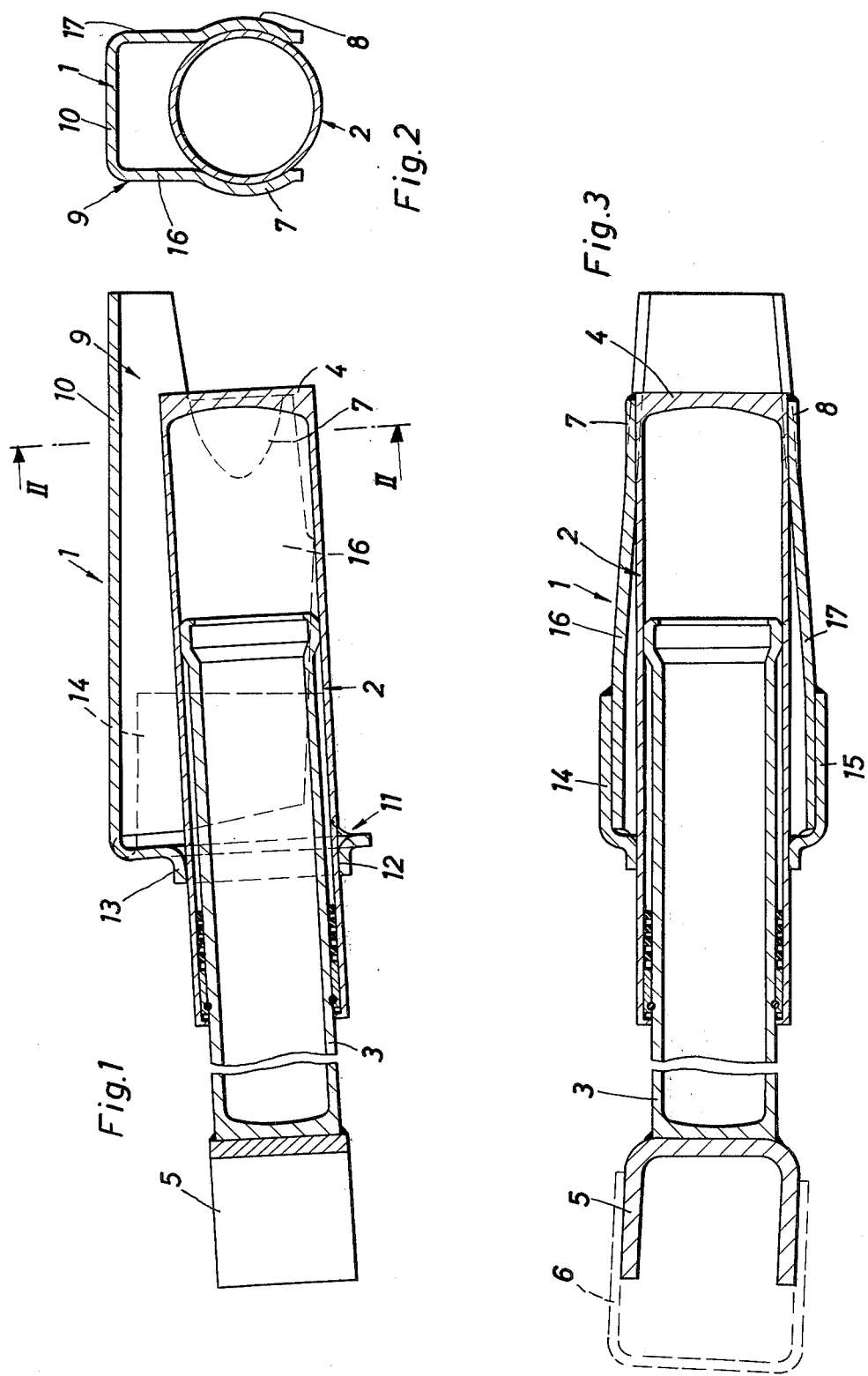

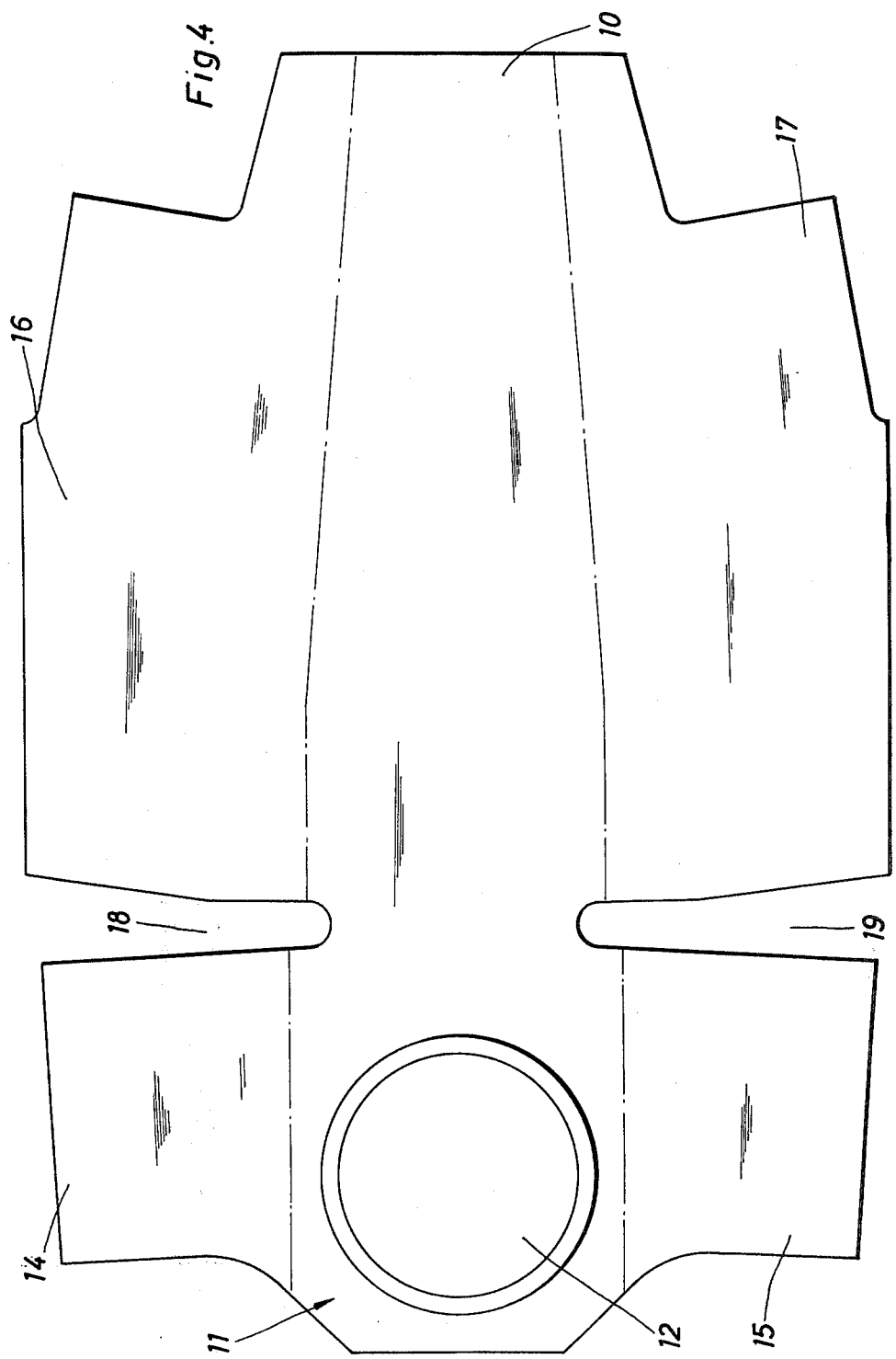

IMPACT DAMPING SYSTEM AND SUSPENSION THEREFOR

BACKGROUND OF THE INVENTION

The present invention relates to impact damping systems and, more particularly, to apparatus for mounting the damping system on a vehicle.

An impact damping system disclosed in Offenlegungsschrift No. 2,135,000 63c, 70, has a suspension flange welded directly along the length of a shock absorber cylinder. This welded connection, produced by applying heat directly to the shock absorber cylinder, has been found in practice to lead readily to such a warping of the cylinder, that it must be reshaped.

SUMMARY OF THE INVENTION

The object of the present invention is to provide an impact damping system of the type in which a suspension flange is welded to a shock absorber cylinder, but which is constructed such that the adverse effects of the welded connections on the function of the shock absorber are eliminated. This object is achieved according to the present invention by providing the suspension with a posterior division welded to the shock absorber cylinder in the region of its end wall only and an anterior division, at a distance therefrom, embracing the shock absorbing cylinder over at least a portion of its periphery to exert radial compressive stresses on it, while not being welded to it.

An essential of the invention is the absence of welded connections along the course of the shock absorber cylinder proper. There are welded connections only in the region of the end wall of the cylinder, where no warping of the cylinder during the formation of the welds can occur to impair the functioning of the shock absorber. However, in order that the shock absorber may be securely held in the region of the open end of its cylinder, from which the displacement piston protrudes, the suspension also has an anterior division, located at a distance from the welded posterior division, which grasps the cylinder radially, preferably in the manner of a press fit. For this purpose, the anterior division may preferably be embodied as a vertical plate with a flanged hole to accept the cylinder.

In an especially simple embodiment of the invention for production purposes, the anterior and posterior divisions are built in one piece adapted to the dimensions of the shock absorber cylinder. The suspension may then be in the form of a cut metal plate that is bent into a U-shaped cross section and formed by several bending and cutting operations into a somewhat boxlike housing which conforms to the shock absorber cylinder.

BRIEF DESCRIPTION OF THE DRAWINGS

The foregoing and other features of the present invention will be more readily apparent from the following detailed description and drawings of an exemplary embodiment in which:

FIG. 1 is a median horizontal section through an illustrative embodiment of the invention;

FIG. 2 is a sectional view of the embodiment of FIG. 1 along the lines II—II;

FIG. 3 is a median vertical section through the illustrative embodiment of the invention perpendicular to the view in FIG. 1; and FIG. 4 is a top view of a pattern for the stock used to form the suspension of the present invention after various bending operations.

DESCRIPTION OF AN EXEMPLARY EMBODIMENT

FIGS. 1 to 3, illustrate the suspension of the telescoping shock absorber, designated generally by 1, along with the shock absorber cylinder 2 and piston 3, which protrudes from the open end of cylinder 2. The construction of the shock absorber (2, 3) is known per se and, since its details are not essential to the invention, it will not be described further, except to state that the cylinder 2 has an end wall 4, and the free frontal face of the piston 3 bears a fork 5 for attachment of the bumper 6.

The present invention deliberately avoids welded connections between the shock absorber cylinder 2 and the suspension 1 at the periphery of the cylinder, in order to prevent warping and the need for refitting the shock absorber. For this purpose, the suspension 1 has essentially two divisions. The posterior division has two curved zones 7 and 8 that match the periphery of the cylinder 2 in the region of its end wall 4 (FIG. 2). These curved zones are in respective legs 16 and 17 of a member 9 that is bent into a U-shaped cross section. A base 10 of member 9 is connected to the chassis of the vehicle in a manner not shown. As can be seen most clearly in FIG. 3, the present embodiment of the invention has the legs 16 and 17 tapered toward the posterior section so that the U-shaped cross section is smaller toward the rear. This allows the curved zones 7 and 8 of legs 16 and 17, respectively, to contact the cylinder 2 near the end face where the welded connections are made. The other portions of legs 16 and 17 are not in contact with the cylinder and hence do not transmit the welding heat to it along its length where it might cause interference with the operation of the shock absorber. The anterior division of the suspension has a plate 11 made in one piece with the base 10. Plate 11 is bent down in a direction at least approximately perpendicular to the axis of the shock absorber. A hole 12 is provided in the plate 11 to admit the cylinder 2. In this embodiment the hole 12 in plate 11 is made with a flange or collar 13 into which the cylinder 2 is press fit. The suspension is stiffened by tab-like projections 14 and 15 on flange 11. These projections are bent perpendicular to the plane of plate 11 so as to lie parallel to the neighboring region of the legs 16 and 17 of the U-shaped cross section 9. In this embodiment, by way of example, the tablike projections 14 and 15 overlap the legs 16 and 17 and are welded to them. In any event, however, welds directly on the cylinder 2 are avoided, except for the welds at its end walls 4.

The suspension 1 described with reference to FIGS. 1 to 3 is produced by bending operations upon a cut metal plate as shown in top view in FIG. 4. The reference numbers previously used in the discussion of FIGS. 1 and 3 are included here. It is seen that the entire suspension is a single part with a passage hole 12 and two cut-outs 18 and 19 to divide the tabs or projections 14 and 15 from the legs 16 and 17 of the future U-shaped cross section.

While the invention has been particularly shown and described with reference to a preferred embodiment thereof, it will be understood by those skilled in the art that various changes in form and details may be made therein without departing from the spirit and scope of the invention.

I claim:

1. An impact damping system, having a telescoping shock absorber and a suspension for the system, said shock absorber comprising a cylinder welded to the suspension and being open at one end and closed off at the other end by an end wall, and a displacement piston which slides in telescope-fashion in the cylinder through its open end, said piston having a portion thereof extending from the cylinder, an impact receiving means being rigidly attached to the extending portion of the piston, said impact damping system being characterized in that the suspension for the system comprising a single cut metal plate having a posterior section located in the vicinity of the end wall of the cylinder and an anterior section located at a distance from the end wall along the cylinder in the direction toward the open end of the cylinder, said posterior section of the metal plate being bent into a U-shaped cross section with a base and two legs, the legs of the U-shaped cross section conforming to and being welded to the cylinder only in the region of its end wall so as to rigidly locate the cylinder, the anterior section being in the form of a continuation of the base of the U-shaped posterior section and being bent into a plane substantially perpendicular to the direction of the cylinder axis and the base of the posterior section, said anterior section defining a flanged hole, that matches the diameter of the cylinder, in which said cylinder is press fit and rigidly located.

2. A system according to claim 1, wherein the cross-sectional area of the posterior section is progressively smaller in the direction from the open end of the cylinder towards the end wall and wherein the legs of the U-shaped cross section conform to the cylinder by having curved areas that match the periphery of the cylinder.

3. An impact damping system, having a telescoping shock absorber and a suspension for the system, said shock absorber comprising a cylinder welded to the suspension and being open at one end and closed off at the other end by an end wall, and a displacement piston which slides in telescope-fashion in the cylinder through its open end, said piston having a portion thereof extending from the cylinder, an impact receiving means being attached to the extending portion of the piston, said impact damping system being characterized in that the suspension for the system comprises a single cut metal plate having a posterior section located in the vicinity of the end wall of the cylinder and an anterior section located at a distance from the end wall along the cylinder in the direction toward the open end of cylinder, said posterior section of the metal plate being bent into a U-shaped cross section with a base and two legs, the legs of the U-shaped cross section conforming to and being welded to the cylinder only in the region of its end wall, the anterior section being in the form of a continuation of the base of the U-shaped posterior section and having a first portion bent into a plane substantially perpendicular to the direction of the cylinder axis and the base of the posterior section, said first portion of the anterior section defining a flanged hole, that matches the diameter of the cylinder, in which said cylinder is press fit, second portions of said anterior section being in the form of lateral projections extending from the first portion and being bent substantially parallel to and overlapping the legs of the U-shaped posterior section, the second portions also being welded to the posterior section.

* * * * *